United States Patent
Alpert et al.

(10) Patent No.: US 7,484,199 B2
(45) Date of Patent: Jan. 27, 2009

(54) BUFFER INSERTION TO REDUCE WIRELENGTH IN VLSI CIRCUITS

(75) Inventors: Charles J. Alpert, Cedar Park, TX (US);
Tuhin Mahmud, Austin, TX (US);
Stephen T. Quay, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 78 days.

(21) Appl. No.: 11/383,544

(22) Filed: May 16, 2006

(65) Prior Publication Data

US 2007/0271543 A1 Nov. 22, 2007

(51) Int. Cl.
*G06F 17/50* (2006.01)
(52) U.S. Cl. ............................. 716/13; 716/2
(58) Field of Classification Search .................. 716/13, 716/2
See application file for complete search history.

(56) References Cited

U.S. PATENT DOCUMENTS

| | | | | |
|---|---|---|---|---|
| 6,085,238 A | * | 7/2000 | Yuasa et al. | 709/223 |
| 6,230,300 B1 | * | 5/2001 | Takano | 716/2 |
| 6,347,393 B1 | | 2/2002 | Alpert et al. | |
| 6,591,411 B2 | * | 7/2003 | Alpert et al. | 716/13 |
| 6,910,202 B2 | * | 6/2005 | Minami et al. | 716/18 |
| 7,051,310 B2 | * | 5/2006 | Tsao et al. | 716/10 |
| 7,168,057 B2 | * | 1/2007 | Drumm et al. | 716/10 |

OTHER PUBLICATIONS

Zhou et al., "Efficient Minimum Spanning Tree Construction Without Delaunay Triangulation," Information Processing Letters vol. 81, n. 6, pp. 271-276 (Mar. 2002).

* cited by examiner

*Primary Examiner*—Paul Dinh
*Assistant Examiner*—Patrick Sandoval
(74) *Attorney, Agent, or Firm*—Casimer K Salys; Jack V. Musgrove (57) ABSTRACT

Wirelength in a net of an integrated circuit design is reduced by forming clusters of sinks to be interconnected, inserting a buffer at each cluster, and providing branch connections between clusters by connecting a sink of one cluster to a buffer of another cluster, to create a buffer tree spanning all sinks. The buffers are inserted at a point on a respective bounding box of a cluster that is closest to a source for the net. A sink that provides a branch connection to the buffer of another cluster is the closest sink to that buffer (except for those sinks in the cluster). Clusters may be formed by examining different pairs of the sinks with different bounding boxes, and identifying one of the pairs whose bounding box has a lowest half-perimeter as the best pair for clustering.

14 Claims, 8 Drawing Sheets

BUFFER INSERTION TO REDUCE WIRELENGTH IN VLSI CIRCUITS

BACKGROUND OF THE INVENTION

1. Field of the Invention

The present invention generally relates to the fabrication and design of semiconductor chips and integrated circuits, specifically to a method of designing the physical layout (placement) of logic cells in an integrated circuit and the wiring (routing) of those cells, and more particularly to the use of buffer insertion to manage timing and electrical requirements in an integrated circuit design.

2. Description of the Related Art

Integrated circuits are used for a wide variety of electronic applications, from simple devices such as wristwatches, to the most complex computer systems. A microelectronic integrated circuit (IC) chip can generally be thought of as a collection of logic cells with electrical interconnections between the cells, formed on a semiconductor substrate (e.g., silicon). An IC may include a very large number of cells and require complicated connections between the cells. A cell is a group of one or more circuit elements such as transistors, capacitors, resistors, inductors, and other basic circuit elements grouped to perform a logic function. Cell types include, for example, core cells, scan cells and input/output (I/O) cells. Each of the cells of an IC may have one or more pins, each of which in turn may be connected to one or more other pins of the IC by wires. The wires connecting the pins of the IC are also formed on the surface of the chip. For more complex designs, there are typically at least four distinct layers of conducting media available for routing, such as a polysilicon layer and three metal layers (metal-1, metal-2, and metal-3). The polysilicon layer, metal-1, metal-2, and metal-3 are all used for vertical and/or horizontal routing.

An IC chip is fabricated by first conceiving the logical circuit description, and then converting that logical description into a physical description, or geometric layout. This process is usually carried out using a "netlist," which is a record of all of the nets, or interconnections, between the cell pins. A layout typically consists of a set of planar geometric shapes in several layers. The layout is then checked to ensure that it meets all of the design requirements, particularly timing requirements. The result is a set of design files known as an intermediate form that describes the layout. The design files are then converted into pattern generator files that are used to produce patterns called masks by an optical or electron beam pattern generator. During fabrication, these masks are used to pattern a silicon wafer using a sequence of photolithographic steps. The process of converting the specifications of an electrical circuit into a layout is called the physical design.

Cell placement in semiconductor fabrication involves a determination of where particular cells should optimally (or near-optimally) be located on the surface of a integrated circuit device. Due to the large number of components and the details required by the fabrication process for very large scale integrated (VLSI) devices, physical design is not practical without the aid of computers. As a result, most phases of physical design extensively use computer-aided design (CAD) tools, and many phases have already been partially or fully automated. Automation of the physical design process has increased the level of integration, reduced turn around time and enhanced chip performance. Several different programming languages have been created for electronic design automation (EDA), including Verilog, VHDL and TDML. A typical EDA system receives one or more high level behavioral descriptions of an IC device, and translates this high level design language description into netlists of various levels of abstraction.

Faster performance and predictability of responses are elements of interest in circuit designs. As process technology scales to the submicron regime, interconnect delays increasingly dominate gate delays. Consequently, physical design optimization tools such as floorplanning, placement, and routing are becoming more "timing-driven" than the previous generation of tools. Owing to the tremendous drop in VLSI feature size, a huge number of buffers (i.e., amplifiers or inverters) are needed for achieving timing objectives and fixing electrical violations for interconnects. It is estimated that the number of buffers will rise dramatically, reaching about 15% of the total cell count for intrablock communications for 65 nanometer technology, and close to 800,000 buffers required for 50 nanometer technologies. Therefore, both the complexity and importance of buffer insertion is increasing in an even faster pace.

Physical synthesis is prominent in the automated design of integrated circuits such as high performance processors and application specific integrated circuits (ASICs). Physical synthesis is the process of concurrently optimizing placement, timing, power consumption, crosstalk effects and the like in an integrated circuit design. This comprehensive approach helps to eliminate iterations between circuit analysis and place-and-route. Physical synthesis has the ability to repower gates, insert buffers, clone gates, etc., so the area of logic in the design remains fluid. However, physical synthesis can take days to complete.

During physical synthesis, buffer insertion is called for to either optimize nets for delay or to fix nets due to electrical violations. One mechanism for performing buffer insertion on a fixed Steiner integrated circuit topology is known as the van Ginneken algorithm. Given a fixed Steiner tree topology, the van Ginneken algorithm finds the optimal buffer placement on the topology under an Elmore delay model for a single buffer type and simple gate delay model. The primary idea of van Ginneken is to choose a set of buffer candidate locations that lie on the Steiner topology at some uniformly fixed distance apart. Buffer insertion then proceeds for that particular set of candidates from sink to source. When a candidate location falls within a region that is blocked because it is too densely populated with logic, that location is skipped and a buffer is inserted into the next candidate insertion location that is not blocked while maintaining the uniform spacing.

Figure 1:
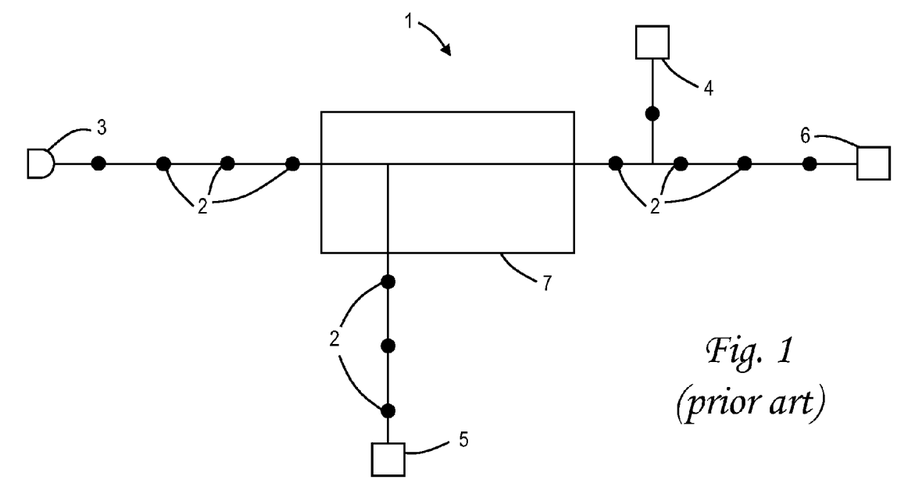
FIG. 1 is a diagram of a Steiner tree for a net of an integrated circuit design showing candidate buffer insertion points at regular intervals along the paths from a source to several sinks, according to the prior art van Ginneken algorithm.

As seen in FIG. 1, a Steiner tree representation of a net 1 places candidate buffer insertion points 2 at regular intervals along the paths from source 3 to sinks 4, 5 and 6. A logic cell 7 (or a portion of a logic cell) is present in the path of the net. The portion of the net block by logic cell 7 is skipped when determining candidate buffer insertion points 2. The spacing between candidate insertion points may be increased or decreased by the designer to achieve a particular timing requirement. Increasing the frequency of buffer insertion locations can improve timing of the net, but at an increased buffer cost.

During physical synthesis, nets can become inefficiently wired for many reasons, such as placement, legalization around blockages, or area-driven buffer insertion. Inefficient wire placement can adversely affect routability and can also waste power, which is an increasing problem with more resistive wiring. It would, therefore, be desirable to devise an improved method of buffer insertion to better optimize wirelength in VLSI circuits. It would be further advantageous if the method could save power while improving routability.

SUMMARY OF THE INVENTION

It is therefore one object of the present invention to provide an improved method of buffer insertion in VLSI circuits.

It is another object of the present invention to provide such a method which reduces wirelength.

It is yet another object of the present invention to provide an improved method of buffer insertion which improves routability and saves power.

The foregoing objects are achieved in a method of reducing wirelength in a net of an integrated circuit design, by identifying a plurality of sinks in the net that are to be interconnected with a source, forming two or more clusters of the sinks, inserting a buffer at each respective cluster, connecting a given buffer to sinks of its respective cluster, connecting the source to at least a first buffer in a first one of the clusters, and connecting a first one of the sinks in the first cluster to at least a second one of the buffers in a second one of the clusters to create a buffer tree from the source to all sinks. The buffers are advantageously inserted at a point on a respective bounding box of a cluster that is closest to the source. The first sink that provides a branch connection to the second cluster is preferably the closest sink to that corresponding buffer out of all of the sinks except those in the second cluster. Clusters may be formed by examining different pairs of the sinks that define respective bounding boxes, and identifying one of the pairs whose bounding box has a lowest half-perimeter as the best pair for clustering. The sinks in the best pair are merged to form a cluster. Any overlap between two of more clusters may be removed by determining which of a plurality of horizontal cuts between sinks of the overlapping clusters and a plurality of vertical cuts between sinks of the overlapping clusters provides an optimum partition.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The present invention provides a novel method for determining buffer insertion locations in a net of an integrated circuit design, and is generally applicable to any type of IC design, such as general-purpose microprocessors, memory units or special-purpose circuitry. The method may be implemented as part of a physical synthesis process which optimizes placement, timing, power consumption, crosstalk effects or other design parameters. As explained more fully below, exemplary embodiment of the present invention utilizes high fanout clustering of net sinks and rewired buffers to produce a more efficient buffered wirelength.

Figure 2:
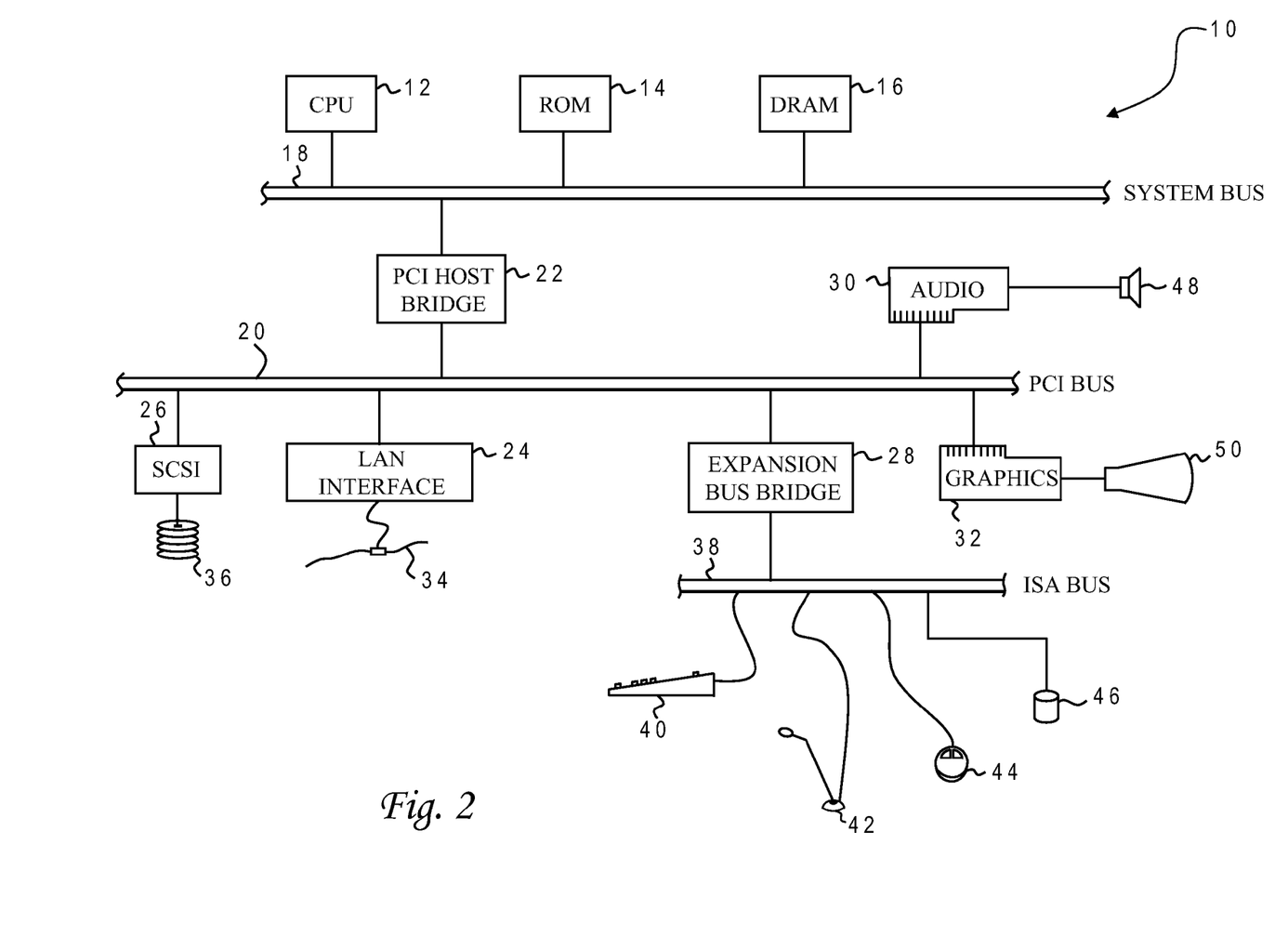
FIG. 2 is a block diagram of a computer system programmed to carry out computer-aided design of an integrated circuit in accordance with one implementation of the present invention.

With reference now to the figures, and in particular with reference to FIG. 2, there is depicted one embodiment 10 of a computer system programmed to carry out the buffer insertion in accordance with one implementation of the present invention. System 10 includes a central processing unit (CPU) 12 which carries out program instructions, firmware or read-only memory (ROM) 14 which stores the system's basic input/output logic, and a dynamic random access memory (DRAM) 16 which temporarily stores program instructions and operand data used by CPU 12. CPU 12, ROM 14 and DRAM 16 are all connected to a system bus 18. There may be additional structures in the memory hierarchy which are not depicted, such as on-board (L1) and second-level (L2) caches. In high performance implementations, system 10 may include multiple CPUs and a distributed system memory.

CPU 12, ROM 14 and DRAM 16 are coupled to a peripheral component interconnect (PCI) local bus 20 using a PCI host bridge 22. PCI host bridge 22 provides a low latency path through which processor 12 may access PCI devices mapped anywhere within bus memory or I/O address spaces. PCI host bridge 22 also provides a high bandwidth path to allow the PCI devices to access DRAM 16. Attached to PCI local bus 20 are a local area network (LAN) adapter 24, a small computer system interface (SCSI) adapter 26, an expansion bus bridge 28, an audio adapter 30, and a graphics adapter 32. LAN adapter 24 may be used to connect computer system 10 to an external computer network 34, such as the Internet. A small computer system interface (SCSI) adapter 26 is used to control high-speed SCSI disk drive 36. Disk drive 36 stores the program instructions and data in a more permanent state, including the program which embodies the present invention as explained further below. Expansion bus bridge 28 is used to couple an industry standard architecture (ISA) expansion bus 38 to PCI local bus 20. As shown, several user input devices are connected to ISA bus 38, including a keyboard 40, a microphone 42, and a graphical pointing device (mouse) 44. Other devices may also be attached to ISA bus 38, such as a CD-ROM drive 46. Audio adapter 30 controls audio output to a speaker 48, and graphics adapter 32 controls visual output to a display monitor 50, to allow the user to carry out the buffer insertion as taught herein.

While the illustrative implementation provides the program instructions embodying the present invention on disk drive 36, those skilled in the art will appreciate that the invention can be embodied in a program product utilizing other computer-readable media, including transmission media. The program instructions may be written in the C++ programming language for an AIX environment. Computer system 10 carries out program instructions for an interconnect optimization process that uses novel buffer insertion techniques to manage timing requirements and electrical violations. Accordingly, a program embodying the invention may include conventional aspects of various placement and timing tools, and these details will become apparent to those skilled in the art upon reference to this disclosure.

Figure 3A:
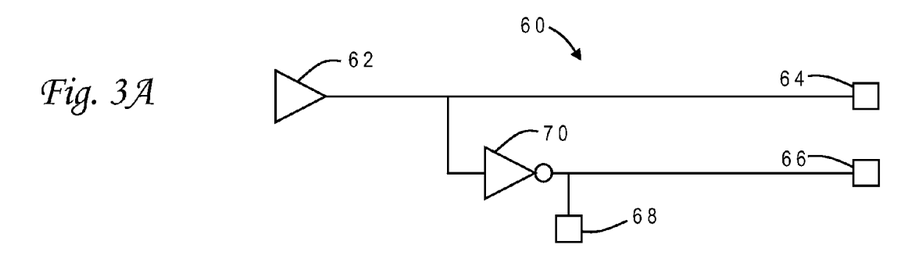
FIG. 3A is a schematic diagram illustrating a simplified example of a net whose wiring is to be optimized as part of a physical synthesis process.
Figure 3B:
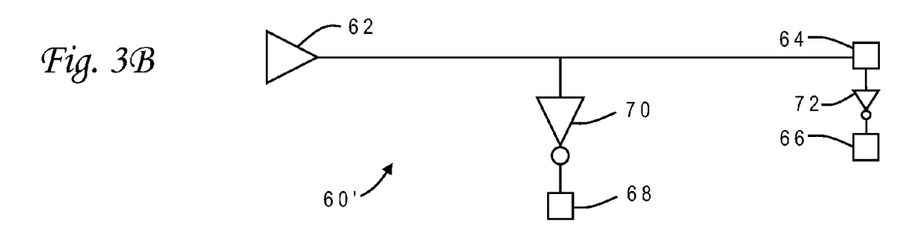
FIG. 3B is a schematic diagram illustrating buffer insertion for the net of FIG. 3A in accordance with one implementation of the present invention.

The present invention provides an improved method of determining buffer insertion locations which may be used to reduce overall wirelength in a net. The general concept of the invention may be understood with reference to the simplified net 60 depicted in FIG. 3A. Net 60 has a driving element or primary input 62, and three output nodes (sinks) 64, 66, 68. The layout shown in FIG. 3A is one example of how a placement tool might provide wiring between the input and outputs based on a netlist. A first wire section directly connects primary input 62 on the left side of the layout to sink 64 on the right side of the layout, and another wire section branches off to an inverter 70. The output of inverter 70 is connected to sink 66 via a third wire section at the right side of the layout, and a fourth wire section branches off to sink 68 closer to inverter 70. This layout may be rewired with buffer insertion as illustrated in the net 60' of FIG. 3B. In this modified layout, inverter 70 is placed slightly to the right to allow a shorter overall wire path for the branching off from primary input 62 to sink 68. The wire section from inverter 70 to sink 66 has been eliminated, and replaced with a new wiring path from sink 64 in which an inverter (buffer) 72 has been inserted. The characteristics of buffer 72 are selected to satisfy the overall timing requirements, i.e., delay the signal at sink 66 with respect to sink 64. It can be seen that the layout of FIG. 3B has significantly less wire due to the elimination of the redundant wire section from inverter 70 to sink 66.

Figure 4:
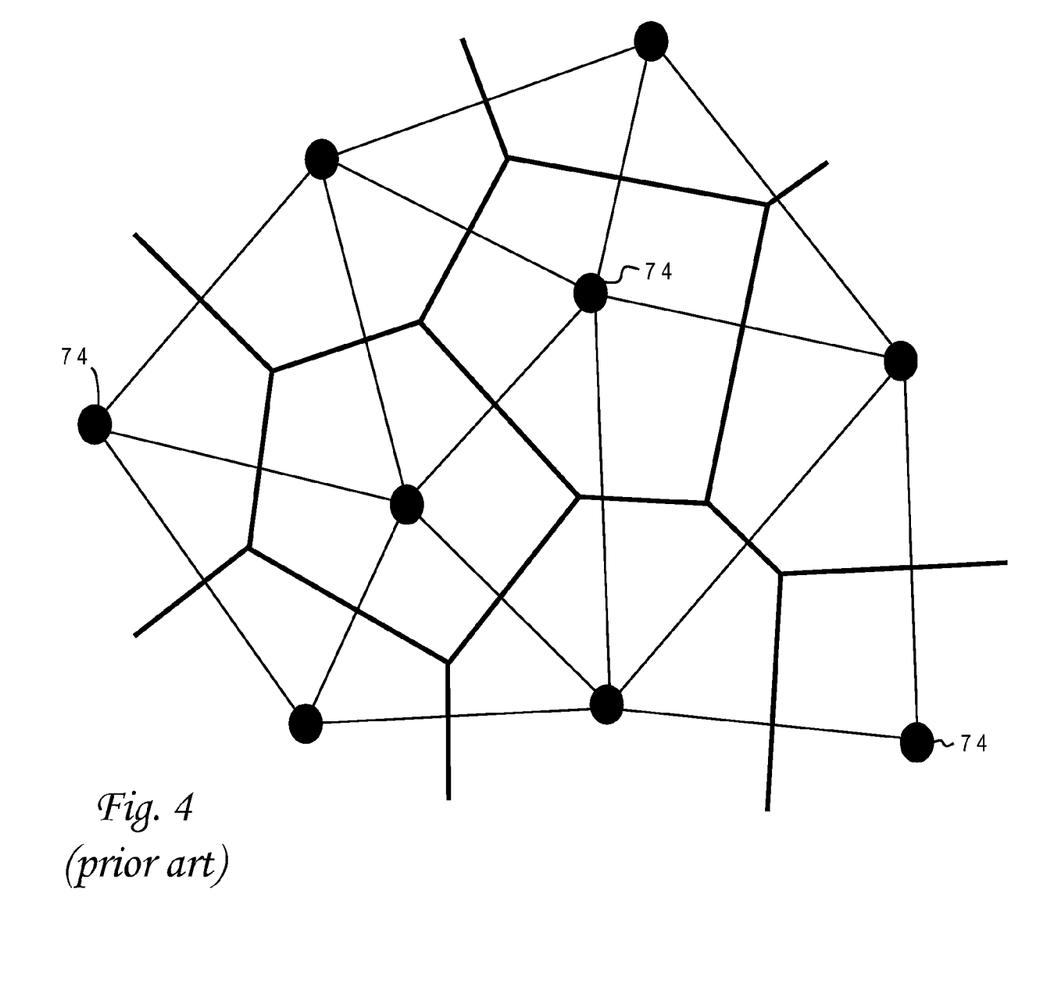
FIG. 4 is a Voronoi diagram illustrating boundaries between sinks of a net and connections between the sinks.

The elimination of wasted wiring is more problematic for a net of an integrated circuit which may contain hundreds of interconnections between sinks. The present invention preferably addresses this problem by using computer system 10 to carry out a nearest neighbor algorithm to construct a spanning graph for the sinks, and carry out a high fanout algorithm to form clusters of sinks. Computer system 10 then performs buffer insertion and re-wiring using the sink clusters. The nearest neighbor algorithm begins by constructing a Voronoi diagram for the net. A Voronoi diagram illustrating sinks 74 of a simplified net is illustrated in FIG. 4. The Voronoi diagram is a well-known construct in computational geometry that divides a plane into regions such that exactly one point lies in each region. A point placed anywhere in the plane will lie in the same region as the point closest to it. In other words, given a set of sinks $a_i, \ldots, a_N$, a Voronoi polygon(a) circumscribes all points that are closer to a than other $a_i$'s.

The dual of the Voronoi diagram is the Delauney triangulation which connects each pair of points in the Voronoi diagram whose regions share a common edge. The Delauney triangulation is known to contain the nearest-neighbor graph, which connects each point to its closest neighbor. The number of edges in the nearest neighbor graph is linear with respect to the number of points. The number of edges in the Delauney triangulation is also linear. Thus, one can efficiently search the Delauney triangulation to uncover the nearest neighbor graph. However, computing these structures can be quite complicated. An improved method of uncovering the nearest neighbor graph without constructing a Delauney triangulation is disclosed in the article "Efficient Minimum Spanning Tree Construction Without Delaunay Triangulation," Hai Zhou et al., Information Processing Letters vol. 81, n. 6, pp. 271-276 (March 2002). According to this method, the points are sorted using a sweep-line algorithm and edges are then constructed that correspond to adjacent points in the sorted list. The result of the computation is a spanning graph which also contains a nearest neighbor graph.

Figure 5A:
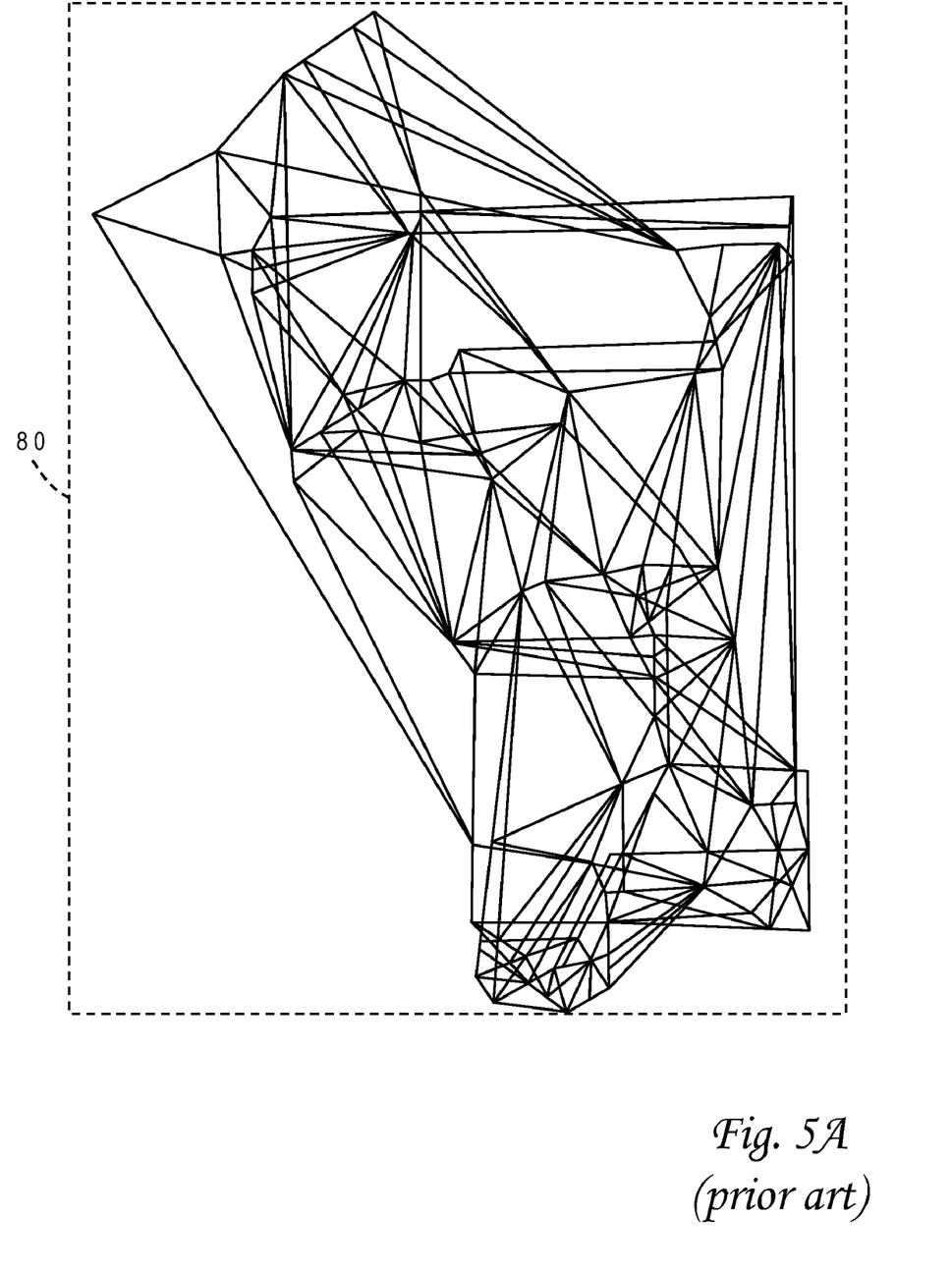
FIG. 5A is a plan view of a spanning graph for a more complicated exemplary net whose wiring is to be optimized as part of a physical synthesis process.
Figure 5B:
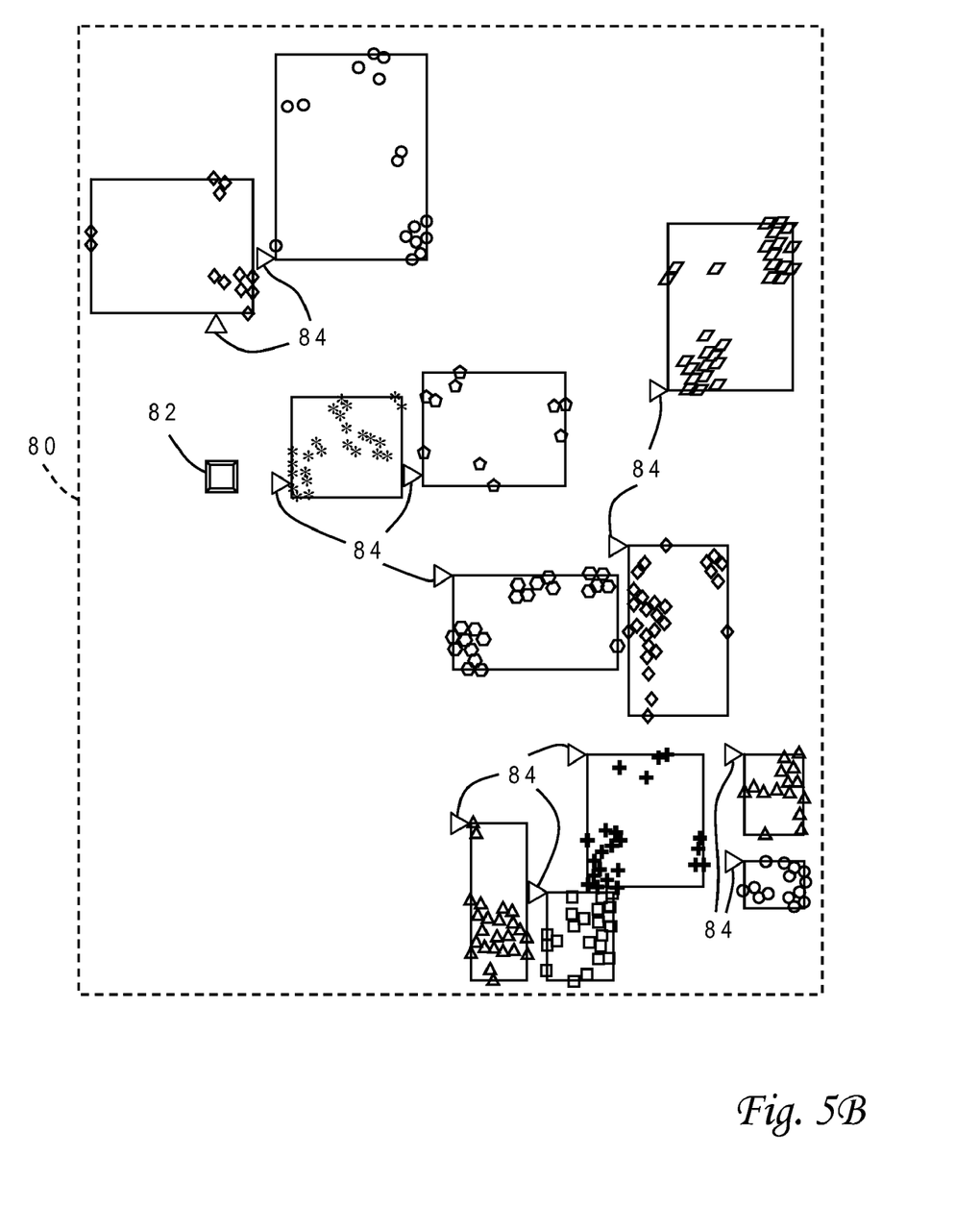
FIG. 5B is a plan view of the clustering of sinks in the net of FIG. 5A in accordance with one implementation of the present invention.

The high fanout clustering algorithm in the illustrative embodiment of the present invention may be further understood with reference to FIGS. 5A and 5B. FIG. 5A is an example of a Zhou-type spanning graph for sinks of a more complicated netlist in a region of an IC chip 80. Clustering begins by examining respective pairs of sinks to identify which pair is the best candidate for a cluster. Use of a spanning graph such as that shown in FIG. 5A reduces the number of pairs that are to be examined for clustering, by computing pair scores only for those sinks which are directly connected in the spanning graph. The criteria for scoring a candidate pair may vary; in the exemplary embodiment, the clustering score $d(u, v)$ for a pair of sinks u and v is defined as the half-perimeter of the rectangular bounding box containing sink u and sink v, subject to some global cardinality constraint. The best pair of sinks is then merged to form the first cluster, and the remaining sinks are similarly examined to find the next best candidate, etc., until all sinks have been paired into clusters (or all but 1 sink has been paired if there are an odd number of sinks). This process is then repeated iteratively treating old clusters from a previous iteration as new sinks until a user-defined control parameter is met, for example, until a target number of clusters has been reached or until a target ratio of sinks to clusters has been reached, e.g., 30 sinks in a cluster. The bounding box for a given cluster is defined by the maximum and minimum layout coordinates of the sinks in that cluster, i.e., the corners of the box are $(x_{min}, y_{min})$, $(x_{min}, y_{max})$, $(x_{max}, y_{min})$ and $(x_{max}, y_{max})$.

This clustering technique is significantly faster than prior art techniques because the time required for the computations is generally on the order of (n log n) where n is the number of sinks, while the prior art clustering time required is generally on the order of ($n^2$ log n). For example, in a net having 86,000 sinks the foregoing clustering algorithm takes about 30 seconds to compute with a state-of-the-art processing system, compared to 4-5 hours required for prior art clustering techniques.

The algorithm of the present invention also provides objective function monitoring during clustering. Consider an example where two clusters A and B are merged to form a new cluster having a half-perimeter L. The next merge iteration is guaranteed to have a slightly larger half-perimeter, e.g., 1.05× L, meaning the next merging has a half-perimeter which is 5% higher. If the jump in the objective function is unusually large, for example changing from L to 1.4×L (a 40% increase), this change may indicate that an undesirable merging of clusters has taken place, since this new cluster has a bounding box perimeter that is much larger relative to any other clustering so far. Such a jump may be an indication that it is a good time to stop clustering. This flexible monitoring when close to the desired number of clusters helps the designer achieve a superior clustering solution.

The rectangular bounding boxes for the final iteration of clusters may have some overlaps as an artifact of the clustering algorithm. While overlapping boxes may still be used with the remainder of the re-wiring process as described below, overlapping clusters generally lead to inefficient wirelength, so the present invention preferably removes any overlap by adjusting the clusters. Two or more clusters that overlap are initially merged into a single cluster, with the sinks in the merged cluster referred to as $v_1, \ldots v_n$. If M is the maximum number of points allowed in any given cluster (according to the user definition), then $n \leq 2M$. A determination is then made as to which of (i) a plurality of horizontal cuts between sinks in the merged cluster and (ii) a plurality of vertical cuts between sinks in the merged cluster provides an optimum partition. In the exemplary embodiment the parameter for determining the optimum partition is the lowest sum of half-perimeters of the two bounding boxes for the particular cut. In other words, a given cut line (horizontal or vertical) splits the merged cluster into two clusters have respective bounding boxes; the bounding boxes are computed for each partition of the merged cluster using successive horizontal cut lines, and the bounding boxes are computed for each partition of the merged cluster using successive vertical cut lines. The pair of bounding boxes with the lowest half-perimeter sum is picked as the best solution for the overlapping clusters. This operation can be completed in $O(n \log n)$ time.

Those skilled in the art will appreciate that the terms "horizontal" and "vertical" are relative and more generally refer to any independent axes of the particular coordinate system (e.g., Cartesian) being used, whether or not orthogonal.

Figure 5C:
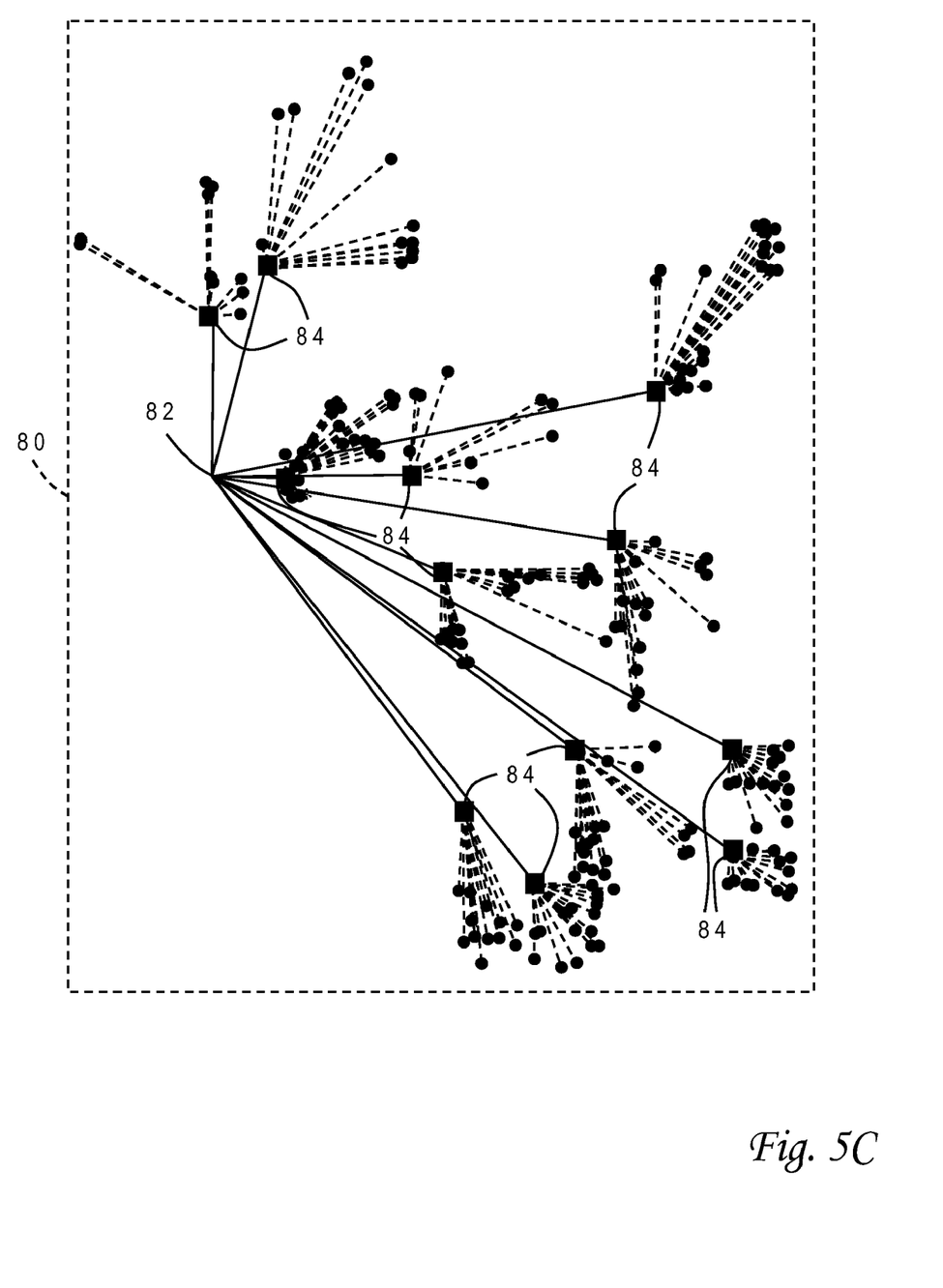
FIG. 5C is a plan view of a wiring layout with buffer insertion for the clustered net of FIG. 5B in accordance with one implementation of the present invention.

FIG. 5B shows an example of how the sinks for the wiring layout of IC chip 80 in FIG. 5A might be formed into clusters in accordance with the foregoing clustering and overlap removal. There are a total of 12 final clusters in this example. FIG. 5B also introduces an input source 82, whose location may be determined based on other placement routines. Re-wiring of the sinks begins by adding a buffer 84 to drive each cluster. Buffers 84 are located on the bounding boxes at a point closest to source 82. Preliminary interconnections are then laid out between source 82 and each buffer 84, as illustrated in FIG. 5C (straight lines), and local connections are added from a given buffer to sinks within its cluster (dashed lines).

Figure 5D:
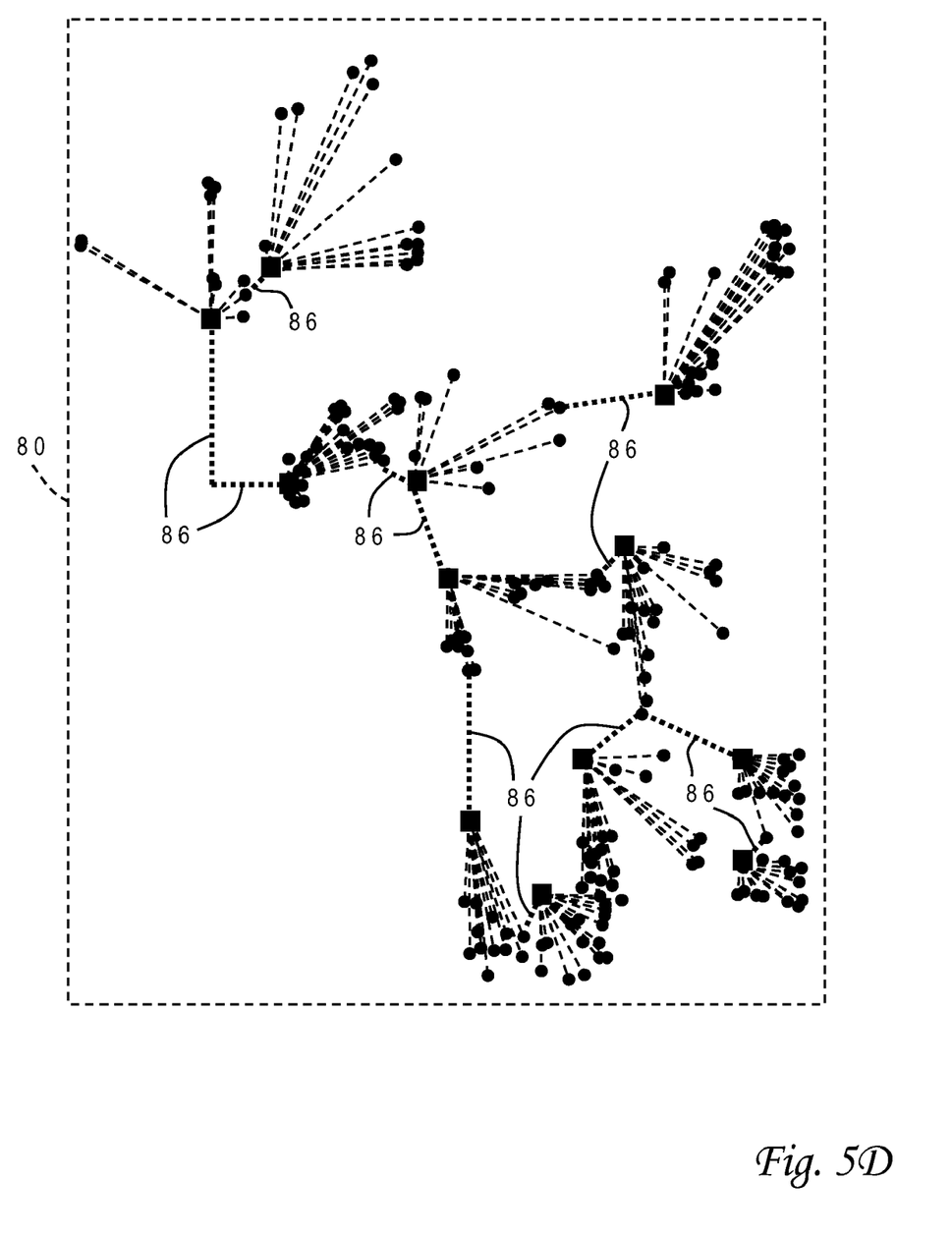
FIG. 5D is a plan view of a rewired layout for the clustered net of FIG. 5B with shorter branch sections interconnecting some adjacent clusters in accordance with one implementation of the present invention.

Wirelength is thus initially reduced by defining clusters of sinks, placing a buffer at each cluster, and then providing wiring from the source to the buffers. FIG. 5D illustrates how wirelength may be further reduced by selectively providing stitches or branch connections 86 (dotted lines) between a sink of one cluster and a buffer of another cluster, that replace some preliminary interconnections between the buffers and the source. In other words, a given buffer is no longer necessarily connected directly to source 82, but may be connected indirectly via one or more other clusters, in a daisy-chain fashion to form a buffer tree that spans the clusters. Branch connections 86 can be formed any number of ways. In the exemplary implementation, a minimum spanning tree originating at source 82 is computed over the clusters, where the branch connection between any two clusters is the shortest distance from the inserted buffer of one cluster to any sink in another cluster. A given sink may have more than one branch connection to buffers of nearby clusters.

Wirelength reduction is not necessary for all nets, as some will have only a small amount of wasted wire (windage) in the original placement/layout, rendering the present invention superfluous. The chip designer may initially quantify the windage of a net in order to determine whether any wirelength reduction is deemed necessary or desirable. If the windage exceeds a user-defined threshold (e.g., 200 tracks, or 0.1 mm), the net can be re-wired as described above. The following windage detection algorithm may be used. A tree with k buffers will have k+1 trees. A first windage value B is calculated as the total wirelength of the k+1 trees. The buffers are then removed from the net, and a second windage value A is calculated as the wirelength of the minimum Steiner tree for the unbuffered net. The windage is defined as B−A. If the windage of the net does not significantly improve after re-wiring, then the old layout can be retained, based on designer preference. For example, if the windage improves by around 100 tracks, then the new buffer tree is preferably used.

Testing has shown that wirelength reduction in accordance with the foregoing can result in a significant improvement over prior art techniques. In one example, a net of 3799 sinks having an original layout with 1500 mm of wire and 955 buffers was re-wired to a new net with 88 mm wire and 128 buffers. The principle of the present invention can also be applied to other wiring parameters besides windage, such as routing congestion.

Figure 6:
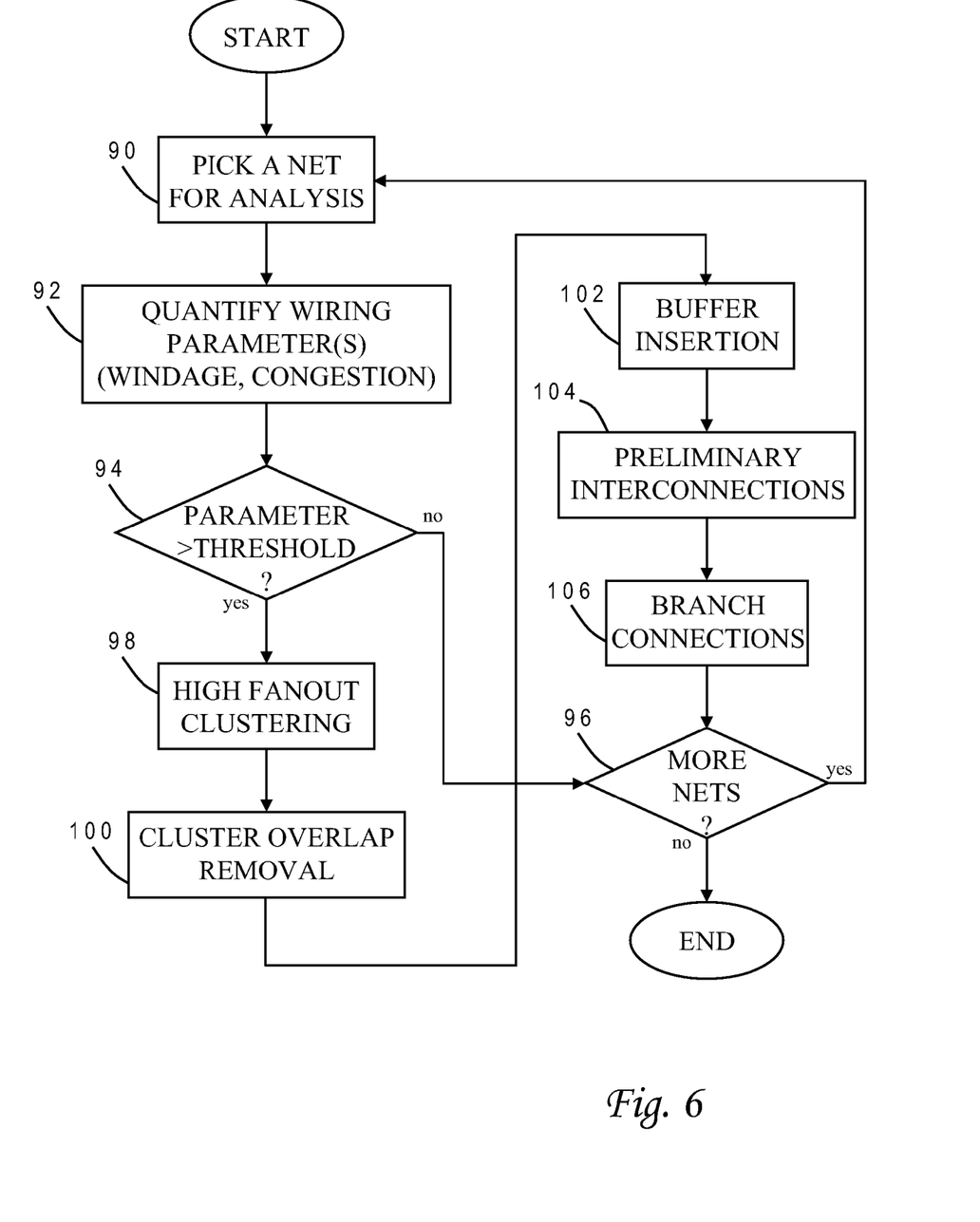
FIG. 6 is a chart illustrating the logical flow for one implementation of the present invention.

The present invention may be further understood with reference to the chart of FIG. 6, which illustrates the logical flow of the wirelength reduction process in accordance with one implementation. The process begins by picking a net of the IC chip for analysis (90). The wiring parameter of concern (e.g., wirelength or routing congestion) may first be quantified (92) and compared to the threshold (94). If the parameter does not exceed the threshold, the re-wiring process is skipped for this net, and a check is made to see if there are additional nets to be analyzed (96); if so, the process repeats iteratively at step 90. If the calculated wiring parameter does exceed the predetermined value, re-wiring begins with high fanout clustering (98) and cluster overlap removal (100). A buffer is inserted along the bounding box of each final cluster (102), and preliminary interconnections are defined between the buffers and a source for the net (104). Branch connections are then provided to form a buffer tree for the clusters (106). Re-wiring is complete for that net, so a check is made to see if there are additional nets to be analyzed (96). The process ends once all nets have been analyzed.

Re-wiring in accordance with the present invention is most suitable for nets with a large number of sinks, e.g., greater than 125 sinks. If a net has fewer sinks, the designer may choose other re-wiring techniques that are more efficient for smaller nets, such as the prior art mini-Steiner buffering approach.

The present invention solves the problem of wasted wirelength from buffer insertion, providing a powerful productivity tool for the designer during physical synthesis. In doing so, the present invention reduces power consumption and wiring congestion in the net. All other known buffering approaches are timing-driven which creates a problem for large fanout nets since the timing constraints at the sinks will usually not be accurate, because the delay through the driving gate is extremely large (the source is driving a huge load). Until the buffered tree is computed, one cannot tell which sinks are critical, so having a timer-less buffering approach as taught by the present invention is advantageous, and further allows for a very efficient algorithm, i.e., not having to invoke incremental timing analysis.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention has been disclosed in the context of a two-dimensional layout or net, the definitions and algorithms described herein may be extended to three dimensions as required. It is therefore contemplated that such modifications can be made without departing from the spirit or scope of the present invention as defined in the appended claims.

What is claimed is:

1. A method of reducing wirelength in a net of an integrated circuit design, comprising:
    identifying a plurality of sinks in the net to be interconnected with a source;
    forming two or more clusters of the sinks, wherein the forming of the clusters includes removing an overlap between two of the clusters by determining which of a plurality of horizontal cuts between sinks of the overlapping clusters and a plurality of vertical cuts between sinks of the overlapping clusters provides an optimum partition;
    inserting buffers at selected clusters;
    connecting buffers at selected clusters to sinks in respective clusters;
    connecting the source to at least a first buffer in a first one of the clusters; and
    connecting a first one of the sinks in the first cluster to at least a second one of the buffers in a second one of the clusters to create a buffer tree from the source to the sinks, wherein the connection between the first sink and the second buffer is the shortest distance from the second buffer to any sink outside of the second cluster.

2. The method of claim 1 wherein a given one of the buffers is inserted at a point on a bounding box of a respective one of the clusters that is closest to the source.

3. The method of claim 1 further comprising:
    establishing a threshold value for a wiring parameter of the net; and
    determining that the wiring parameter of the net exceeds the threshold value.

4. The method of claim 1 wherein a given cluster is formed by:
    examining different pairs of the sinks which define respective bounding boxes;
    identifying one of the pairs whose bounding box has a lowest half-perimeter as the best pair for clustering; and
    merging the best pair of sinks to form one of the clusters.

5. A method of reducing wirelength in a net of an integrated circuit design, comprising:
    identifying a plurality of sinks in the net to be interconnected with a source;
    forming two or more clusters of the sinks, wherein the forming of the clusters includes removing an overlap between two of the clusters by determining which of a plurality of horizontal cuts between sinks of the overlapping clusters and a plurality of vertical cuts between sinks of the overlapping clusters provides an optimum partition;
    inserting buffers at selected clusters;
    connecting buffers at selected clusters to sinks in respective clusters;
    determining that a windage of the net exceeds a predetermined threshold, wherein the windage is computed as a wirelength of a minimum Steiner tree for the net without buffering subtracted from a total wirelength of all trees in the net defined by the buffers;
    connecting the source to at least a first buffer in a first one of the clusters; and
    connecting a first one of the sinks in the first cluster to at least a second one of the buffers in a second one of the clusters to create a buffer tree from the source to the sinks, wherein the connection between the first sink and the second buffer is the shortest distance from the second buffer to any sink outside of the second cluster.

6. The method of claim 5 wherein a given one of the buffers is inserted at a point on a bounding box of a respective one of the clusters that is closest to the source.

7. The method of claim 5 wherein a given cluster is formed by:
    examining different pairs of the sinks which define respective bounding boxes;
    identifying one of the pairs whose bounding box has a lowest half-perimeter as the best pair for clustering; and
    merging the best pair of sinks to form one of the clusters.

8. A method of reducing wirelength in a net of an integrated circuit design, comprising:
    identifying a plurality of sinks in the net to be interconnected with a source;
    forming two or more clusters of the sinks by examining different pairs of the sinks which define respective bounding boxes, identifying one of the pairs whose bounding box has a lowest half-perimeter as the best pair for clustering, and merging the best pair of sinks to form one of the clusters;
    inserting buffers at selected clusters;
    connecting buffers at selected clusters to sinks in respective clusters;
    connecting the source to at least a first buffer in a first one of the clusters; and
    connecting a first one of the sinks in the first cluster to at least a second one of the buffers in a second one of the clusters to create a buffer tree from the source to the sinks, wherein the connection between the first sink and the second buffer is the shortest distance from the second buffer to any sink outside of the second cluster.

9. The method of claim 8 wherein a given one of the buffers is inserted at a point on a bounding box of a respective one of the clusters that is closest to the source.

10. The method of claim 8 further comprising:
    establishing a threshold value for a wiring parameter of the net; and
    determining that the wiring parameter of the net exceeds the threshold value.

11. The method of claim 8 wherein the forming of the clusters includes removing an overlap between two of the clusters by determining which of a plurality of horizontal cuts between sinks of the overlapping clusters and a plurality of vertical cuts between sinks of the overlapping clusters provides an optimum partition.

12. A method of reducing wirelength in a net of an integrated circuit design, comprising:
    identifying a plurality of sinks in the net to be interconnected with a source;
    forming two or more clusters of the sinks by examining different pairs of the sinks which define respective bounding boxes, identifying one of the pairs whose bounding box has a lowest half-perimeter as the best pair for clustering, and merging the best pair of sinks to form one of the clusters;
    inserting buffers at selected clusters;
    connecting buffers at selected clusters to sinks in respective clusters;
    determining that a windage of the net exceeds a predetermined threshold, wherein the windage is computed as a wirelength of a minimum Steiner tree for the net without buffering subtracted from a total wirelength of all trees in the net defined by the buffers;
    connecting the source to at least a first buffer in a first one of the clusters; and connecting a first one of the sinks in the first cluster to at least a second one of the buffers in a second one of the clusters to create a buffer tree from the source to the sinks, wherein the connection between the first sink and the second buffer is the shortest distance from the second buffer to any sink outside of the second cluster.

13. The method of claim 12 wherein a given one of the buffers is inserted at a point on a bounding box of a respective one of the clusters that is closest to the source.

14. The method of claim 12 wherein the forming of the clusters includes removing an overlap between two of the clusters by determining which of a plurality of horizontal cuts between sinks of the overlapping clusters and a plurality of vertical cuts between sinks of the overlapping clusters provides an optimum partition.

* * * * *